United States Patent [19]

Turner

[11] Patent Number: 5,553,130
[45] Date of Patent: Sep. 3, 1996

[54] NUMBER TRANSLATION SERVICES MATRIX

[75] Inventor: George W. Turner, Nepean, Canada

[73] Assignee: Bell Sygma Inc., Toronto, Canada

[21] Appl. No.: 445,538

[22] Filed: May 22, 1995

[30] Foreign Application Priority Data

Apr. 25, 1995 [CA] Canada .................................. 2147776

[51] Int. Cl.$^6$ .................................................. H04M 7/00
[52] U.S. Cl. ........................ 379/220; 379/207; 379/289; 379/230
[58] Field of Search ................................. 379/201, 210, 379/211, 207, 220, 229, 230, 112, 115, 289

[56] References Cited

U.S. PATENT DOCUMENTS

| | | | |
|---|---|---|---|
| 5,136,636 | 8/1992 | Wegrzynowicz | 379/207 |
| 5,311,572 | 5/1994 | Friedes et al. | 379/67 |
| 5,311,584 | 5/1994 | Bogart et al. | 379/220 |
| 5,323,452 | 6/1994 | Dickman et al. | 379/201 |
| 5,386,467 | 1/1995 | Ahmad | 379/220 |
| 5,404,395 | 4/1995 | Bogart et al. | 379/201 |
| 5,436,957 | 7/1995 | McConnell | 379/88 |
| 5,452,350 | 9/1995 | Reynolds et al. | 379/220 |

OTHER PUBLICATIONS

Berman et al., "Perspectives on the AIN Architecture", IEEE Communications Magazine, pp. 27–32. Feb. 1992.

*Primary Examiner*—Jeffery Hofsass
*Assistant Examiner*—Daniel S. Hunter
*Attorney, Agent, or Firm*—Foley & Lardner

[57] ABSTRACT

A method is disclosed for processing call data among telephone switching offices and a remotely located database system, called an SCP (Services Control Point), such that one large monolithic application at the SCP is shared among a very large number of individual services. Specifically, the disclosure pertains to the means of achieving the necessary service differentiation at the SCP, namely through: i) the use of a very powerful transaction processor, capable of addressing massive amounts of memory and dealing with large numbers of real time events; ii) the assignment of service-specific memory addressing ranges (identified hereafter as Numbering Plans, which can be either Open or Private) in one large monolithic application; iii) the use of service-specific search keys within Numbering Plans; iv) a rich common service logic tree, and common reference library, capable of being pruned down to match the service logic needs of individual services, and of individual customers within those services; v) rapid screen customization at the service provisioners' workstations to meet service-specific operations requirements; and vi) a criss-cross numbering plan table that enable services which require the caller's identity to maintain their integrity. The result is a matrix with all the services on one axis and all the service features on the other, such that the intersections of services and features can be customized by the Telco to meet specific service needs.

20 Claims, 6 Drawing Sheets

| REAL NUMBER | VIRTUAL NUMBER |
|---|---|
| . | . |
| . | . |
| 416-967-0897 | 002-443-0200 |
| 416-968-3241 | 555-435-0987 |
| . | . |
| 514-234-1234 | 001-446-5476 |
| 514-235-4567 | 000-567-9876 |
| . | . |
| . | . |
| . | . |

| Trigger type | Service Key | Search Key |
|---|---|---|
| off-hook delay | calling NPA | calling number |
| public office dialing plan | Access Code | called number |
| customized dialing plan | BGID | called number |
| terminating trigger | terminating NPA | directory number |

NUMBER TRANSLATION SERVICES MATRIX

SUMMARY OF THE INVENTION

This invention relates to telecommunications Intelligent Network call routing, via SS7 signaling from a network of switches to a remotely located database called an SCP (Services Control Point), but more particularly to a method of partitioning the SCP for simultaneously supporting a very large number of individual services.

BACKGROUND OF THE INVENTION

NTS (Number Translation Services) is a domain of switched voice/data network telecommunications services wherein the dialed telephone number does not necessarily represent the physical number at which a call terminates. In other words, the dialed number is virtual as opposed to real. Virtual numbers must be translated into real numbers before network routing can take place, hence the domain's name. Well-known examples of NTS are 800 and 900 Services. Each of these services has its own 7-digit Open (i.e., not Private) Numbering Plan. Each active number in the Numbering Plan is the address of a customer record, which in turn contains the customer's profile. An important element of the profile is the real terminating number.

With a conventional call, where the dialed number is real, a network switch can perform network routing by analyzing the first 3 or 6 digits (i.e., NXX or NPA+NXX). NXX refers to the fourth to sixth digits of a 10-digit PSTN number (i.e., NPA+NXX+XXXX). The "N" digit is any value 2–9 and each of the "X" digits is any value 0–9.

Because these digits identify geographical areas of the network, the call can simply be forwarded to a switch that is closer to (or at) the destination. On the other hand, if a virtual number is encountered, the only way of knowing where to route the call is to consult a database that contains the virtual numbers and their corresponding real numbers.

Initially, when services such as 800 Service had low penetration, and thus few numbers in their Numbering Plans, it was acceptable to maintain an internal database within each switch. Then, as the quantity of numbers increased, it became necessary to consolidate all the databases into a single entity (replicated for network survivability) called the SCP (Service Control Point).

NTS that are based on unique access codes such as 800 and 900 have been around for many years. Recently, however, there has been growing pressure to introduce NTS to the basic PSTN (Public Switched Telephone Network). This pressure has come from several sources: i) business customers wanting to own their local telephone numbers, and hence lobbying for local number portability; ii) business customers wanting local NTS feature functionality such as Universal Access Number (i.e., having the same local telephone number provide access to many terminating locations) and time-dependent routing; iii) personal number mobility requirements, giving wired networks cellular-like roaming capabilities; and iv) the need to reduce telephone companies operating expense associated with conventional moves and changes. The result is expected to be a burgeoning demand for new access codes based on existing 3 and 6-digit prefixes, and hence many more Numbering Plans.

Another major growth area for NTS involves VPN (Virtual Private Networks). With VPN, business customers are able to establish personalized networks that share switch and transport resources with the PSTN. This is a far more cost-effective approach than having stand-alone physical networks with resources devoted entirely to individual customers. However, it is inherent to VPN that each customer have a unique Private Numbering Plan, such that the abbreviated in-house numbers can be translated into actual PSTN terminations.

Yet another growth area pertains to FX (Foreign Exchange) service, which is one of the most popular business long-distance services. This service involves customers who subscribe to telephone service in distant cities—i.e., in foreign telephone exchanges. The traditional approach has been to extend a very long, dedicated, physical telephone line from the distant city to the customer's remote premises. However, with the use of service-specific Numbering Plans for incoming and outgoing calls, it becomes possible for FX customers to be served from the nearest telephone office, thereby sharing the PSTN resources and eliminating the need for long, costly, dedicated telephone lines.

The phenomenal growth in NTS applications, sparked by the trends highlighted above, is expected to fuel a correspondingly phenomenal demand for new Numbering Plans, both Open and Private. Moreover, because the scope of NTS is expanding horizontally rather than vertically, and also down market from large business customers to basic POTS customers, demand to increase the power of the feature superset is expected to have a relatively low priority. These observations suggests that the ideal service creation environment is one that facilitates replication of a basic set of functionality in new Numbering Plans in the shortest possible time. This is contrary to the conventional service creation approach which focuses almost entirely on creating new services through enhancement of the feature set.

Traditionally, major new Intelligent Network services have been built as entirely new applications, especially when they have been associated with new Numbering Plans. Moreover, these applications have generally been deployed on different sets of SCP processors, if not completely separate SCPs. This has resulted in the same or very similar service logic being created over and over again, albeit through the use of library functions intended to facilitate service logic replication. Thus, the principal disadvantages of the traditional service creation methods are higher deployment cost, reduced network efficiency, wasted development effort, and longer time to market for the services.

Service creation schemes featuring service logic modules that can be structured randomly into tree-like structures are in widespread use under various trade names. In general, these schemes generate logic trees (called "decision graphs" or "call processing records", etc.) through work stations that incorporate high-level graphical programming languages and feature the use of "palettes", "icons", and other abstractions. The design intent of these schemes is service creation through additions to the feature set, and they are generally aimed at satisfying the needs of an entire service as a single entity.

On the other hand, with the advent of virtual telephone numbers, the interaction with terminating features that identify callers, must not be affected. For example, Caller Identifier, Call Return and other features of this type need to provide the called party with a number that can be returned to reach the caller. With the phasing out of physical or real numbers, and their subsequent irrelevance to customers, the number recorded must be the caller's virtual number. Accordingly, a solution is required to deal with this potentially undesirable interaction.

A need therefore exists for providing a new SCP platform which reduces the above shortcomings.

Accordingly, it is an object of the present invention to provide a new SCP platform capable of simultaneously handling a large number of completely independent 7-digit open numbering plans and 4-digit private numbering plans.

Another object of the present invention is to provide a new SCP platform with a data configuration which forms a matrix with numbering plans on one axis and service features on another axis.

Another object of the present invention is to provide an NTS matrix wherein service-specific memory addressing ranges corresponding to numbering plans are assigned.

Another object of the present invention is to provide an NTS matrix wherein service-specific search keys are used within each numbering plan to enable number translation.

Another object of the present invention is to provide an NTS matrix wherein each numbering plan in the matrix shares a common service logic tree and common reference library, capable of being pruned down to match the service logic needs of individual numbering plans.

Yet another object of the present invention is to provide in combination with the NTS matrix, a companion criss-cross numbering plan table, such that a look-up therein, using the real number of the calling party, will yield the virtual one.

In accordance with an embodiment of the present invention, there is provided in a telephone network having a number of telephone switching offices equipped with SSPs (Service Switching Points) operating with AIN (Advanced Intelligent Network) application software, and a remotely located SCP (Service Control Point) adapted to receive SS7 (Signaling System 7) messages from the SSPs, a method of translating a dialed number at the SCP to enable the routing of a call on the telephone network, comprising the steps of:

receiving at a first SSP a number of digits sent from a calling station;

identifying an access code from the received digits using the SSP's IN trigger;

formulating an SS7 message appropriate to the IN trigger used;

transmitting the SS7 message from the first SSP to the remotely located SCP via a CCS (Common Channel Signaling) transport facility;

pre-translating at the SCP the received SS7 message to determine the appropriate numbering plan and an assigned search key;

identifying, using the assigned search key, within the determined numbering plan a routing number;

formulating another SS7 message at the SCP containing the routing number; and transmitting the formulated SS7 message to the first SSP to instruct the telephone network how the complete the call.

In accordance with another embodiment of the present invention, there is provided in a telephone network having a number of telephone switching offices equipped with SSPs (Service Switching Points) operating with AIN (Advanced Intelligent Network) application software, and a remotely located SCP (Service Control Point) adapted to receive SS7 (Signaling System 7) messages from the SSPs and translate a dialed number to enable the routing of a call on the telephone network, the SSP having means for identifying an access code from the received digits using a IN trigger and means for formulating an SS7 message appropriate to the IN trigger used and means for transmitting the SS7 message from the SSP to the remotely located SCP via a CCS (Common Channel Signaling) transport facility, the SCP being comprised of:

means for pre-translating the received SS7 message to determine the appropriate numbering plan and an assigned search key;

means for identifying, using the assigned search key, within the determined numbering plan a routing number;

means for formulating another SS7 message containing the routing number; and means for transmitting the formulated SS7 message to the SSP to instruct the telephone network how the complete the call.

BRIEF DESCRIPTION OF THE DRAWINGS

The invention will be better understood by an examination of the following description, together with the accompanying drawings, in which.

DESCRIPTION OF THE PREFERRED EMBODIMENTS

Figure 1:
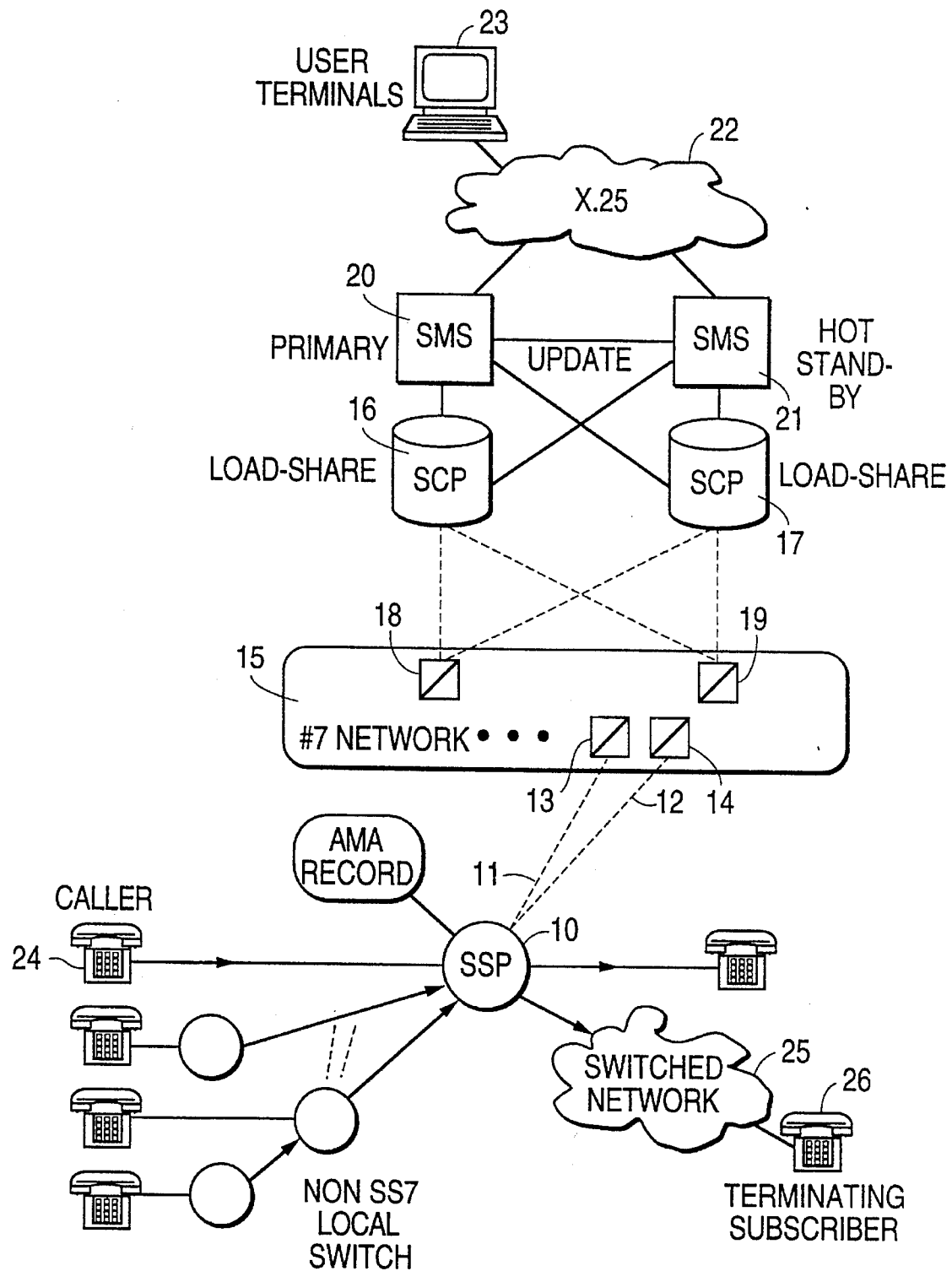
FIG. 1 is a block diagram the main elements forming part of a generic IN telephone network.

Referring now to FIG. 1, we have shown a block diagram of the main elements forming part of a generic IN telephone network. A switch 10 equipped with AIN software serves as an SSP (Service Switching Point) for number translation services. Switch 10 has SS7 signaling links 11 and 12 connecting to an STP (Signaling Transfer Point) pair 13 and 14. On the other side of the SS7 network 15, load-sharing SCPs 16 and 17 are connected to the same or another mated pair of STPs 18 and 19. SCPs 16 and 17 contain the services database. They perform the translation functions and return a response containing routing and billing information to the SSP 10. The two SCPs, each with replicated data, are configured as load-sharing reliability mates. That is, during normal operation, each SCP handles one half of the query traffic. In the failure mode, the remaining operational SCP assumes full load.

Users can access the SMS (Service Management System) 20 and 21 via an X.25 network 22 using GUI (Graphical User Interface) workstations, or block-mode character terminals 23. Each of the two SMSs is co-located with an SCP, sharing the same server platform. One SMS 20 designated as primary is active and handles all service orders. It is also responsible for updating and synchronizing data in both SCPs.

Generally, after station 24 initiates a call, an IN trigger in SSP 10 recognizes the Access Code forming part of the dialed digits. An SS7 message is formulated, containing the calling number, called number, and other data. This information is sent via the SS7 network 15 to one of two SCPs 16 or 17 operating in a load-sharing mode. The information is processed in the selected SCP, resulting in the real terminating number and other data being sent back via SS7 to SSP 10. The SSP then uses received routing number to route the call through the switched network 25 to the terminating station 26.

With the system of the present invention, a new SCP platform is provided which can simultaneously handle at least 1000 (one thousand) completely independent 7-digit Open Numbering Plans, a correspondingly larger number of 4-digit Private Numbering Plans, or various combinations thereof (the upper limit being imposed solely through the arbitrary use of an internal 3-digit Numbering Plan identifier). The resulting data configuration is a matrix with all the Numbering Plans on one axis and all the service features on the other.

Figures 2, 3B:
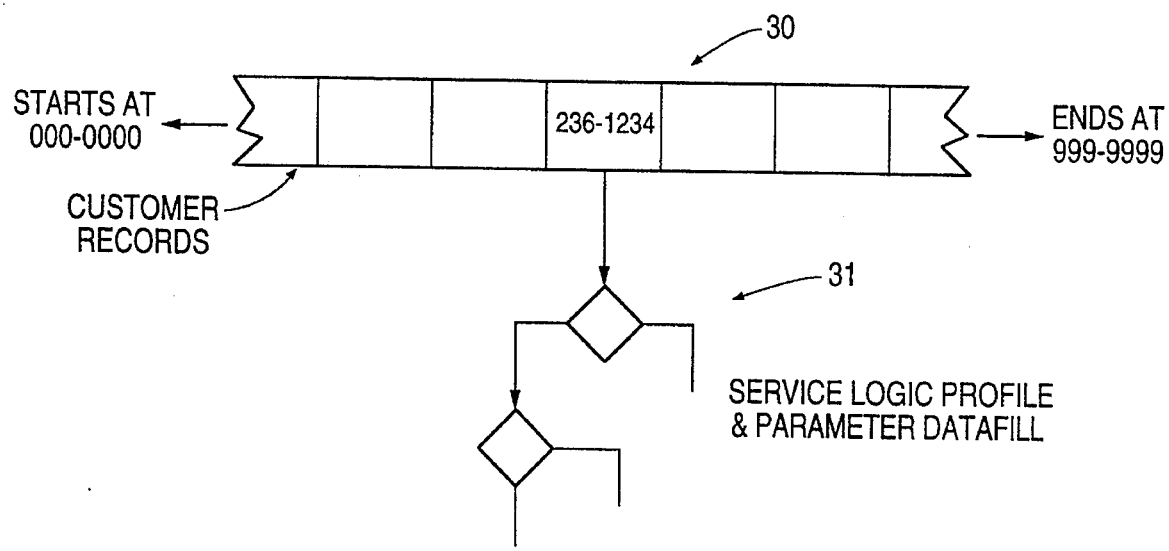
FIG. 2 is a diagram illustrating a typical numbering plan structure.
FIG. 3b is an illustration of a table used for criss-cross numbering plan.

We have shown in FIG. 2, a typical 7-digit Numbering Plan which consists of up to $10^7$ customer records 30, beginning at 000-0000 and ending at 999-9999. Each record containing (if assigned) a particular customer's service logic profile and associated parameter datafill 31. Each of these service logic profiles is in the form of a tree (or "decision graph"), which serves as a road map through the common service logic superset. These trees have been pruned down, if required, to: i) meet the service tariff, and ii) meet the specific customer's needs within the tariff. In order to facilitate rapid service customization, and to allow use of a central reference library, these trees do not represent nor do they point to templates of service-specific compiled code, but rather consist of instructions that must be interpreted as encountered, line-by-line.

Figure 3A:
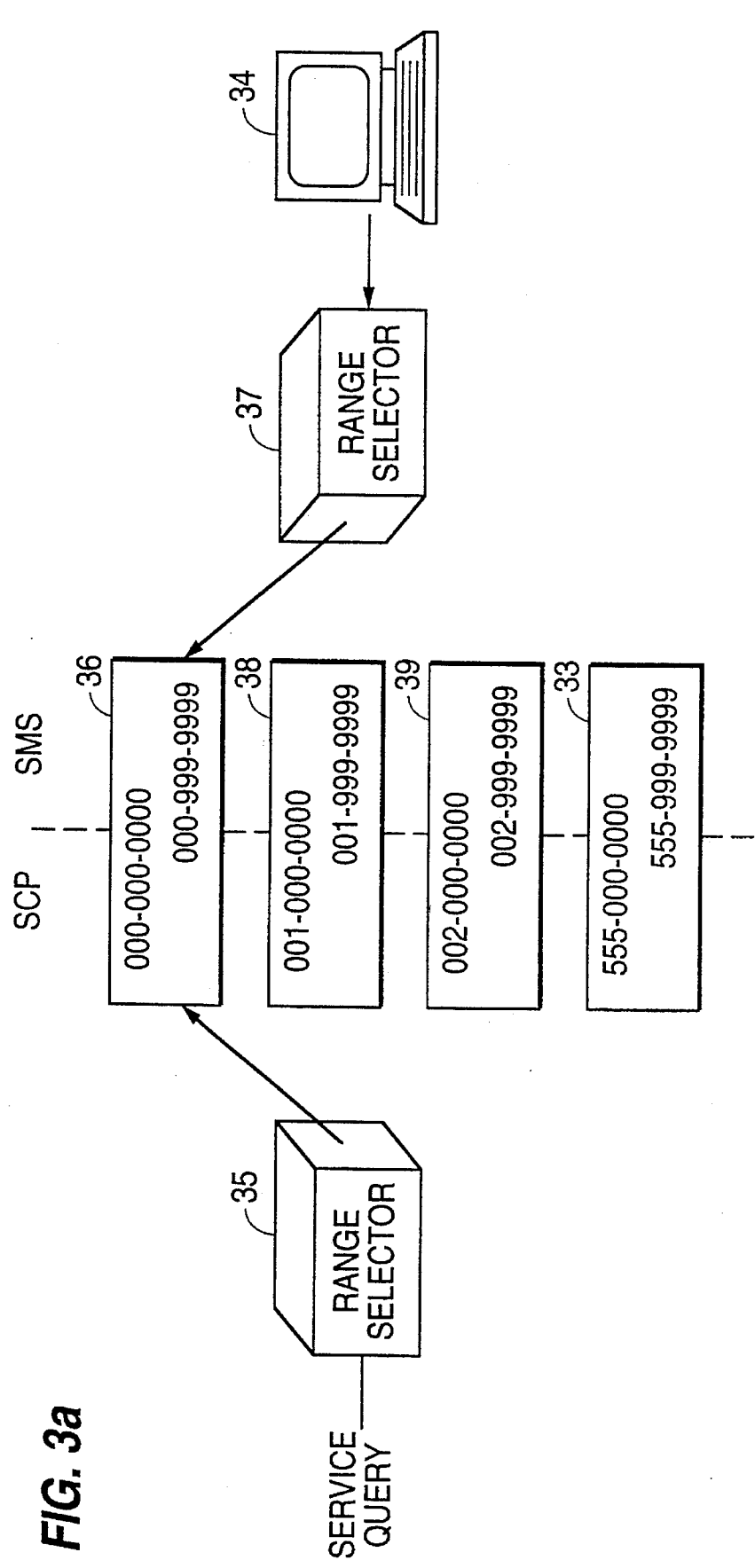
FIG. 3a illustrates how numbering plan ranges are selected.

With the system of the present invention, at least 1000 completely independent 7-digit numbering plans can be provided by use of a memory range selector which pre-translates trigger type and access codes to obtain a 3-digit number pointing to a numbering plan range. FIG. 3a shows the use of a "range selector" 35 at the network side of the SCP to divide $10^{10}$ customer records, beginning at 000 000-0000 and ending at 999 999-9999, into $10^3$ (i.e., 1000) separate, self-standing, 7-digit Numbering Plans, each containing $10^7$ customer records 36. A corresponding range selector 37 on the service provisioning environment side of the SMS provides service provisioners with access to a particular 7-digit Numbering Plan.

FIG. 3b shows a second look-up table which is used to translate the calling station's real number into a virtual number so that destination features that need the caller's identity will work properly. In order to work properly, terminating features such as Caller ID, Call Return, and voice messaging must capture telephone numbers which, when returned, will reach the original calling party. This means that if a call is received from a caller with a virtual number, then it is the virtual number that must be captured and not the traditional equipment-based Calling Line ID. The criss-cross numbering plan table of FIG. 3b can also supply the caller's name, if required by the service. In order to achieve this translation, the current CLID field used in AIN would have to be modified. With this option the CLID field would be substituted with the converted CLID data field.

Figure 4:
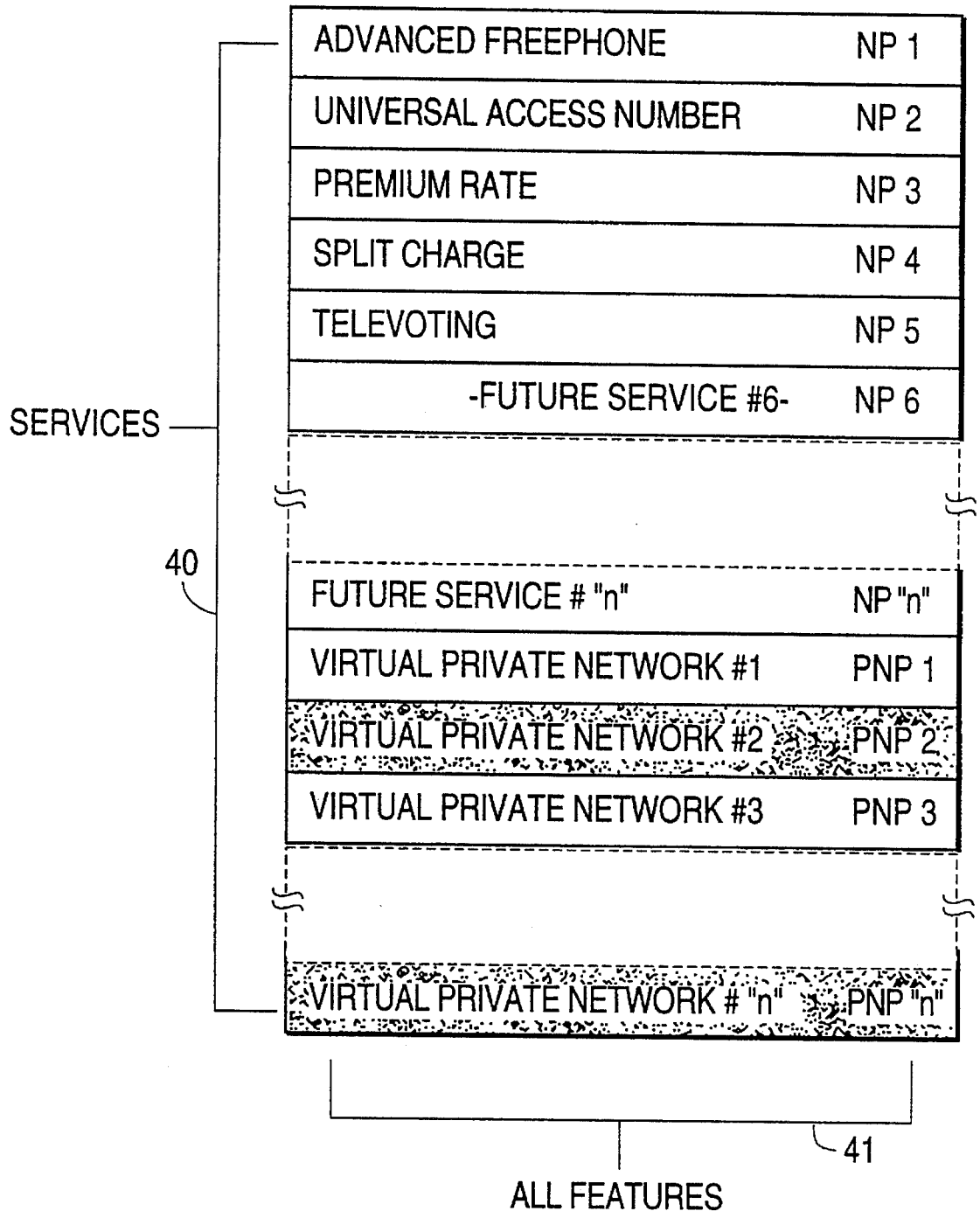
FIG. 4 is a diagram illustrating a matrix of services versus features.

Given that new Number Translation Services are deemed to be equivalent to new Numbering Plans 38 and 39, a matrix, shown in FIG. 4, can be created, with services on one axis 40 (i.e., customer records) and features on the other 41 (i.e., the inventory of service logic modules available to the interpreter). Private Numbering Plans employ a similar range Selector at the network side of the SCP, but use the BGID to narrow down the scope to something less than $10^7$ customer records—typically, $10^4$ records. In this case the BGID may be thought of as a substitute for the NXX, which is not dialed by a customer making an intra-network call.

Referring again to FIG. 1, when a message from the network 15 is presented to the SCP 16 or 17, selection of the appropriate Numbering Plan (shown in FIG. 3a) is based on a "service key" consisting of AIN trigger type, Access Code (e.g., 800), Business Group ID code, or a combination thereof. Call processes within network switches are monitored at various PICs (Points In Call). At each PIC there are triggers. When a PIC is reached, the switch suspends call processing and checks each of the triggers appropriate to that PIC. If a certain call criterion matches data in a datafillable table associated with the trigger, a query message is compiled and launched to the SCP. When a response message is received from the SCP, the switch resumes call processing according to information contained in the response message. Triggers can be either "assigned" or "office". With the former, only appropriately assigned lines or trunks can encounter the trigger. In the case of an "office" trigger, any call transversing the switch encounters the trigger. Correspondingly, at the SMS, when a service order administrator at station 34, FIG. 3a, wishes to enter the system to make an addition, deletion, or change, the appropriate Numbering Plan is selected based on an equivalent service key consisting of user privileges, menu selection, BGID, or a combination thereof. New Numbering Plans and their service keys are established entirely through datafill at the SCP and SMS, without the need for software development. Once a new service and its associated Numbering Plan have been set up, customer records up to the limit of the Numbering Plan can be added through normal service provisioning procedures at the SMS.

A "search key", defined when a Numbering Plan is initially established, allows the Numbering Plan to be searched for called number, calling number, DN (Directory Number), or account code. The first search key (i.e., called number), which is the one most frequently used in NTS, allows virtual numbers to be looked up in a database and converted to real numbers. The second search key (i.e., calling number) can be used to look up data in a Numbering Plan pertaining to calling parties, e.g., for OCS (Originating Call Screening) type services. The DN—which is not necessarily the called number, on account of the fact that the latter may be virtual—can be used to look up data in a Numbering Plan pertaining to physical terminations, e.g., for TCS (Terminating Call Screening) type services. The last search key. (i.e., account code) can be used to search a Numbering Plan for Account Card Calling type services.

As shown in FIG. 3a, the SCP/SMS complex has a "service customization" workstation 34 that allows assembly of the pre-translations for new Numbering Plans. Translation parameters consist of i) the IN trigger type; and ii) either an Access Code, NPA, or Business Group ID. These parameters are organized into a table shown in FIG. 5, with the service keys grouped by trigger type. This 2-element look-up (trigger type first, followed by the appropriate service key) yields one of the aforementioned 3-digit, internally generated and managed pointers to a customer record address range. Also identified is the search key to be used in the identified Numbering Plan. Thus, the trigger type and service key are used to identify the numbering plan range and the search key identifies the customer's record in the numbering plan's range.

Figures 5, 6:
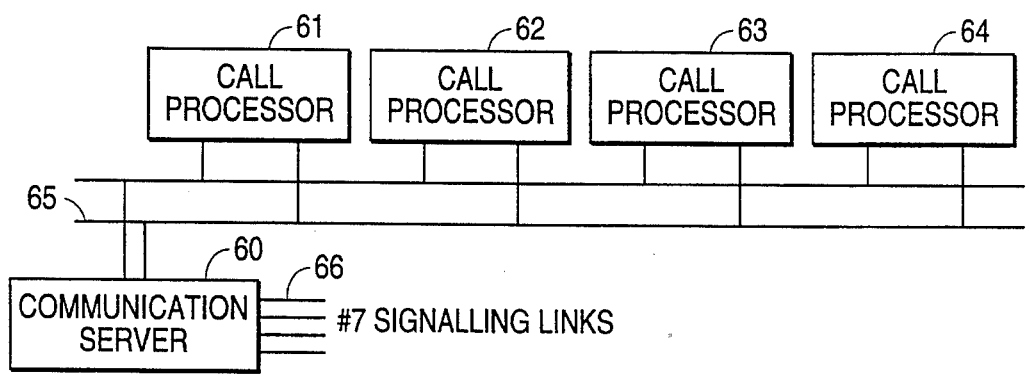
FIG. 5 is a table illustrating the relationship between trigger type, service and search keys.
FIG. 6 is a block diagram of a multi-processor SCP.

Referring now to FIG. 6, we have shown a block diagram of an SCP. The SCP is basically comprised of a communication server 60 connected to multiple parallel processors 61–64 via an interprocessor bus 65. A number of #7 signaling links 66 are used to receive request messages from the SSPs. In this configuration, processing load is shared among processors that perform multiple task simultaneously. Because all services are randomly presented to all processors, there is no need for complex load-balancing algorithms.

Figure 7A:
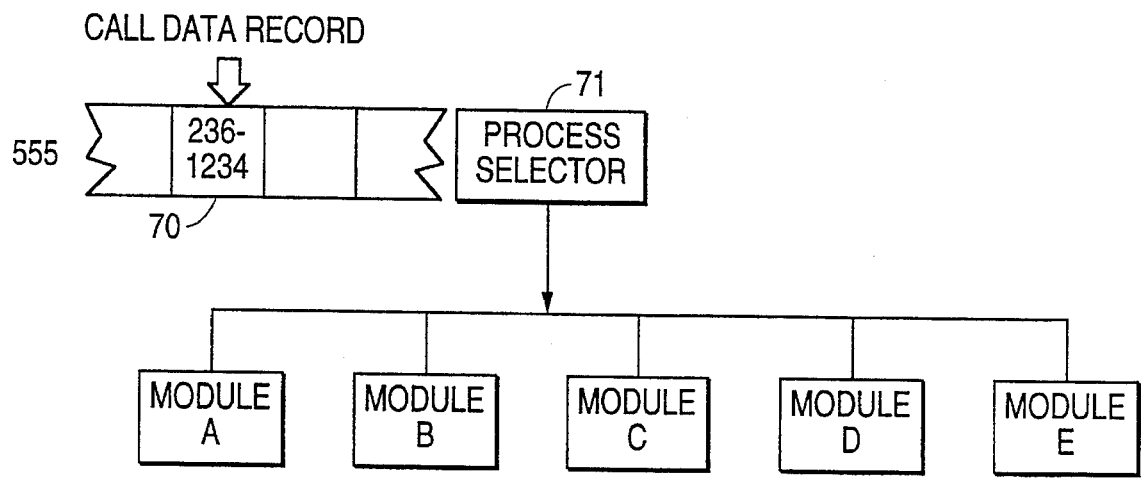
FIGS. 7a and 7b are flow diagrams illustrating the selection of SCP services when a call is received.

Referring now to FIG. 7a, we have shown a flow diagram when a message from a network is processed within the SCP's common inventory of service logic modules. When the processor begins the transaction, it sets up a call data record 70. This record, whose life is only as long as the processing time for the transaction, contains data from the incoming message, plus volatile data to be passed from one service logic process to the next. As the service logic tree is negotiated by the interpreter, a process selector 71 calls the various blocks or modules of service logic code in the common inventory, passing to them the appropriate parameter datafill as arguments. In turn, these modules operate on the call data record until the desired outcome is achieved. These modules can be call routing parameters such as area code routing, time of day routing, calling number, etc. The module selection process will be described further below.

In operation, we can assume as an example that a new Number Translation Service with an NPA Access Code of 888 is introduced. Illustratively, referring again to FIG. 1, the terminating customer at station 26 is assigned 888 236-1234, the last seven digits of which identify a virtual number within this service's Numbering Plan. The customer has a main terminating POTS line addressed by the real number, 416 825-4512, and an after-hours alternate terminating number, 416 425-8702. Incoming calls are only to be received from 416 and 905 NPAs. An ordinary POTS caller at station 24, whose number is 905 342-2616, initiates the exemplary call during normal business hours.

Figure 7B:
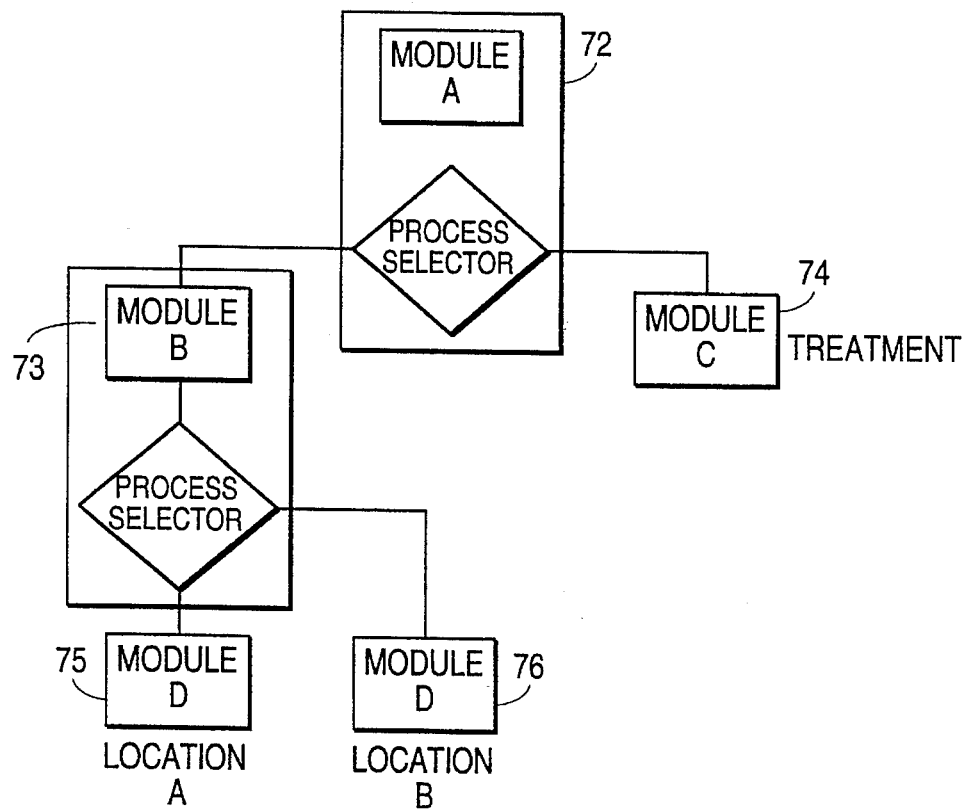

After station 24 initiates the call and dials the digits 888 236-1234, an IN trigger (public office dialing plan) in SSP 10 recognizes the 888 Access Code. The SS7 message is converted by a communications server 60, shown in FIG. 6, into the internal bus protocol of the SCP, where it is presented to one of a multiplicity of parallel processors 61–64 as a data transaction to be handled. First, pre-translation is undertaken to identify the appropriate Numbering Plan (FIG. 5): the originating trigger identity (public office dialing plan) indicates that the "service key" is the Access Code (i.e., the 888 NPA). This combination of trigger type and Access Code is translated by the memory range selector 35 of the SCP into an internally generated and maintained 3-digit number that points to the assigned Numbering Plan—illustratively numbering plan 33 for 3-digit number 555 (FIG. 3a). The translation also reveals that the "search key" is the called number. Therefore, numbering Plan 555 (i.e., customer record range 555 000-0000 to 555 999-9999, shown in FIG. 3a) is searched for the called number and the appropriate customer record is accessed, which in this example is 555 236-1234 (see FIG. 7a). The record contains the necessary information to form a service logic tree with "Area Code Routing" at the top, followed by "Time-of-day Routing". As shown in FIG. 7b, the associated parameter datafill indicates that Area Code Routing 72, Module A, should send a calling number with a 416 or 905 NPA down the tree to Module B, Time-of-day Routing 73. Any other NPA received is directed to Module C 74 for a treatment response. Since the calling number has a 905 NPA, flow proceeds down the service logic tree to Time-of-day Routing 73. The parameter datafill for this service logic module indicates that if the time is between 8:00 a.m. and 5:00 p.m., the output should be to Module D 75; otherwise it should be to Module E 76. Since the call is being made during the normal business day, flow proceeds to Module D 75 and encounters the POTS number for the main terminating number, that is, 416 825-4512. Upon negotiating the service logic tree and reaching its end, the SCP formulates an SS7 message which is sent back out to the network, and to the switch, SSP 10, that initiated the trigger.

If the service logic tree indicates that the caller's identity, such as Caller ID (number and/or name), Call Return, etc. is required a second look-up is made in the criss-cross numbering plan table of FIG. 3b. This is done to translate the calling station's real number into a virtual number so that the destination features that need the caller's identity are maintained. The information from both look-ups, i.e. routing number and virtual number of calling station is then fed back to the originating switch, i.e. SSP 10 via a SS7 message and is used to complete the call.

As indicated previously, a new subscriber profile can be entered in the numbering plan range by a service provisioner via a workstation 34, shown in FIG. 3a. When a service provisioner logs onto an SMS workstation, his or her assigned privileges result in a particular menu being presented on the screen. This menu might present the names of several services, one of which happens to be "888 Service". Selection of 888 Service from the menu gives the provisioner access to 7-digit numbers in the range from 555 000-0000 to 555 999-9999. The provisioner can then add new numbers, delete old ones, or make changes to an existing customer's service logic profile. Only those features that are appropriate to 888 Service appear on the screen, and they have names appropriate to the tariffed service. If a companion criss-cross numbering plan exists, it is updated automatically.

As previously stated, service logic modules and a common reference library are used to create the subscriber's profile. The reference library consists of very large tables (such as Serving Areas and all the NPA+NXX combinations therein) which can be used by many services but which are far too large to store in an individual customer's record, and which vastly simplify administrative overhead by being in one place. The service logic modules in the inventory are ordered in an intuitive way such that some are always nearer to the top of the tree than others. For example, ODR (Origin Dependent Routing) is at the very top of the tree, starting with Area Code Routing. Serving Area Routing (a reference library function) is next in order, followed by 10-digit screening. At the very bottom are modules that branch off to additional look-up tables, or require customization to meet particular service needs. Other modules are allocated positions that fall between these extremes.

The SMS's service provisioning workstations are GUIs (Graphical User Interfaces) with windows, pull-down menus, context-sensitive help, and other tools intended to facilitate a production environment. When a new service and its Numbering Plan are initially defined, the items accessible to these GUIs via the windows and menus are established. This process sets an upper limit as to which service logic modules in the inventory can be included in the most complex service logic tree for the particular service. Accordingly, when a provisioner adds a new customer to the service, he or she selects tables and table-fill items from these service-specific windows and menus (as opposed to dragging icons from a palette and dropping them into an abstract functional sketch), thereby automatically establishing a tree that is equivalent to or less complex than the established upper limit for the service. Then, despite the fact that the GUI screens are essentially table-driven, the aforementioned rigid ordering of service logic modules allows an algorithm within the workstation to "generate" a logic tree which represents the selections. This pseudo logic tree generation—which is more apparent than real—is possible because the system contains a pre-defined template of the full tree, then simply knocks off branches if they are not implicitly identified by the initial service customization, combined with the subsequent action of the service provisioner. Finally, this logic tree, together with parameter values taken from the tables on the screen, are stored in the SMS's master time-relational database against the customer's record in the service-specific Numbering Plan. Memory is dynamically allocated at this time, with the goal of holding the customer record size to the minimum size necessary for the file—an important factor considering the potential size of the matrix and the fact that the vast majority of NTS customers have simple requirements.

Per widespread practice in the industry, the SMS updates the on-line SCPs, at a time specified by a new service order when it is entered by the service provisioner (i.e., "immediate", "normal", or "deferred" until a specific date and time). Upon successful completion of the update, this results in a copy of the aforementioned service logic tree being placed into active service at the SOP and subject to interpretation by messages from the network. The following describes the interpretation process.

Variations of the particular embodiment herewith described will be obvious to one skilled in the art, and accordingly the embodiment is to be taken as illustrative rather than limitive, the true scope of the invention being set out in the appended claims.

I claim:

1. In a telephone network having a number of telephone switching offices equipped with SSPs (Service Switching Points) operating with AIN (Advanced Intelligent Network) application software, and a remotely located SCP (Service Control Point) adapted to receive SS7 (Signaling System 7) messages from the SSPs, a method of translating a dialed number at the SCP no enable the routing of a call on the telephone network to a called station, comprising the steps of:

receiving at a first SSP a number of digits sent from a calling station;

identifying an access code from the received digits using the SSP's IN trigger;

formulating an SS7 message appropriate to the IN trigger used;

transmitting the SS7 message from the first SSP to the remotely located SCP via a CCS (Common Channel Signaling) transport facility;

pre-translating at the SCP the received SS7 message to determine the appropriate numbering plan and an assigned search key;

identifying, using the assigned search key, within the determined numbering plan a routing number associated with said called station;

formulating another SS7 message at the SCP containing the routing number; and transmitting the formulated SS7 message to the first SSP to instruct the telephone network how the complete the call.

2. A method as defined in claim 1, wherein the step of pre-translating comprises pre-translating a trigger type and a service key contained in said message, at a memory range selector of the SCP to determine an internal number pointing to the appropriate numbering plan.

3. A method as defined in claim 2, wherein said trigger type comprises one of an off-hook delay, public office dialing plan, customized dialing plan or terminating trigger.

4. A method as defined in claim 3, wherein said service key comprises one of a calling NPA, access code, business group ID or terminating NPA.

5. A method as defined in claim 4, wherein said search key comprises one of a calling number, called number or directory number.

6. A method as defined in claim 2, wherein said routing number is identified in the appropriate numbering range, by looking up a common inventory of service logic modules.

7. A method as defined in claim 6, wherein said step of identifying said routing number further comprises the step of operating each service logic module on a data record associated with said call, until a desired outcome is achieved and a routing number is identified.

8. A method as defined in claim 1, wherein said step of identifying, using the assigned search key, within the determined numbering plan a routing number further comprises the step of translating the calling station's real number into a virtual number for providing with said routing number.

9. A method as defined in claim 8, wherein said formulated SS7 message transmitted to said SSP comprises a routing number associated with the called station and a virtual number associated with the calling station.

10. A telephone network having a number of telephone switching offices equipped with SSPs (Service Switching Points) operating with AIN (Advanced Intelligent Network) application software, and a remotely located SCP (Service Control Point) adapted to receive SS7 (Signaling System 7) messages from the SSPs and translate a dialed number to enable the routing of a call on the telephone network, comprised of:

a first SSP for receiving a number of digits sent from a calling station;

means for identifying, at the SSP, an access code from the received digits using the SSP's IN trigger;

means for formulating an SS7 message appropriate to the IN trigger used;

means for transmitting the SS7 message from the SSP to the remotely located SCP via a CCS (Common Channel Signaling) transport facility;

means for pre-translating at the SCP the received SS7 message to determine the appropriate numbering plan and an assigned search key;

means for identifying, using the assigned search key, within the determined numbering plan a routing number;

means for formulating another SS7 message at the SCP containing the routing number; and means for transmitting the formulated SS7 message to the SSP to instruct the telephone network how the complete the call.

11. A network as defined in claim 10, wherein said means for pre-translating the received SS7 message is comprised of a memory range selector to pre-translate the trigger type and service key contained in said message to determine an internal number pointing to the appropriate numbering plan.

12. A network as defined in claim 11, wherein said trigger type comprises one of an off-hook delay, public office dialing plan, customized dialing plan or terminating trigger.

13. A network as defined in claim 12, wherein said service key comprises one of a calling NPA, access code, business group ID or terminating NPA.

14. A network as defined in claim 13, wherein said search key comprises one of a calling number, called number or directory number.

15. A network as defined in claim 11, wherein said means for identifying a routing number comprises a common inventory of service logic modules.

16. A network as defined in claim 15, wherein said routing number is identified by operating each service logic module on a data record associated with said call, until a desired outcome is achieved and a routing number is identified.

17. A network as defined in claim 11, wherein said SCP comprises a number translation matrix having numbering plans on one axis and service features on another axis.

18. A network as defined in claim 10, further comprising means for translating a real number associated with the calling station to a virtual number to be associated with the calling station.

19. A network as defined in claim 18, wherein said virtual number associated with the calling station is formulated in said SS7 message for transmission to said SSP.

20. In a telephone network having a number of telephone switching offices equipped with SSPs (Service Switching Points) operating with AIN (Advanced Intelligent Network) application software, and a remotely located SCP (Service Control Point) adapted to receive SS7 (Signaling System 7) messages from the SSPs and translate a dialed number to enable the routing of a call on the telephone network, the SSP having means for identifying an access code from the received digits using a IN trigger and means for formulating an SS7 message appropriate to the IN trigger used and means for transmitting the SS7 message from the SSP to the remotely located SCP via a CCS (Common Channel Signaling) transport facility, said SCP being comprised of:

means for pre-translating the received SS7 message to determine the appropriate numbering plan and an assigned search key;

means for identifying, using the assigned search key, within the determined numbering plan a routing number;

means for formulating another SS7 message containing the routing number; and means for transmitting the formulated SS7 message to the SSP to instruct the telephone network how the complete the call.

* * * * *

UNITED STATES PATENT AND TRADEMARK OFFICE
CERTIFICATE OF CORRECTION

PATENT NO. : 5,553,130
DATED : September 3, 1996
INVENTOR(S) : George W. TURNER

It is certified that error appears in the above-indentified patent and that said Letters Patent is hereby corrected as shown below:

Please note that Column 3, line 55, contains a typographical error wherein "how the complete" should read --how to complete--.

Column 4, line 12, wherein "how the complete" should read --how to complete--.

Column 9, line 43, Claim 1, wherein "no enable" should read --to enable--;

line 66, Claim 1, wherein "how the complete" should read --how to complete--.

Column 10, line 58, Claim 10, wherein "how the complete" should read --how to complete--.

Column 12, line 21, Claim 20, wherein "how the complete" should read --how to complete--.

Signed and Sealed this

Eleventh Day of March, 1997

*Attest:*

BRUCE LEHMAN

*Attesting Officer* Commissioner of Patents and Trademarks